US010953449B2

(12) United States Patent
Gövert et al.

(10) Patent No.: US 10,953,449 B2
(45) Date of Patent: Mar. 23, 2021

(54) METHOD AND DEVICE FOR PRODUCING ROTATIONALLY SYMMETRICAL METAL COMPONENTS

(71) Applicants: Michael Gövert, Cologne (DE); Christian Malkemper, Sendenhorst (DE); Susanne Brinkkötter, Ahlen (DE)

(72) Inventors: Michael Gövert, Cologne (DE); Christian Malkemper, Sendenhorst (DE); Susanne Brinkkötter, Ahlen (DE)

(73) Assignee: ThyssenKrupp Steel Europe AG, Duisburg (DE)

( * ) Notice: Subject to any disclaimer, the term of this patent is extended or adjusted under 35 U.S.C. 154(b) by 0 days.

(21) Appl. No.: 14/963,320

(22) Filed: Dec. 9, 2015

(65) Prior Publication Data

US 2016/0089708 A1     Mar. 31, 2016

Related U.S. Application Data

(63) Continuation of application No. PCT/EP2014/062685, filed on Jun. 17, 2014.

(30) Foreign Application Priority Data

Jun. 17, 2013    (DE) .................... 10 2013 106 268.7

(51) Int. Cl.
*B21D 15/04* (2006.01)
*B21D 17/00* (2006.01)
(Continued)

(52) U.S. Cl.
CPC ............ *B21D 15/04* (2013.01); *B21D 17/00* (2013.01); *B21D 22/08* (2013.01); *B21D 22/16* (2013.01);
(Continued)

(58) Field of Classification Search
CPC ........ B21D 15/04; B21D 17/00; B21D 22/08; B21D 17/02; B21D 17/04; B21D 17/025; B21H 5/027; B21H 7/00
See application file for complete search history.

(56) References Cited

U.S. PATENT DOCUMENTS

| 4,610,154 A | 9/1986 | Carene, Jr. |
| 4,712,409 A | 12/1987 | Killop |

(Continued)

FOREIGN PATENT DOCUMENTS

| CN | 1550271 A | 12/2004 |
| CN | 101827677 A | 9/2010 |

(Continued)

OTHER PUBLICATIONS

Manfred Walther et al., Innovative Verzahnungswalztechnik, Sep. 2003, 2 pages, Bad Düben, Germany.

*Primary Examiner* — Teresa M Ekiert
(74) *Attorney, Agent, or Firm* — Reinhart Boerner Van Deuren P.C.

(57) ABSTRACT

A method for producing rotationally symmetric structural components of metal, in particular steel, is provided. A blank is arranged in a torsion-proof manner on a first receptacle, the receptacle is rotated about a rotation axis so that the blank is caused to rotate about this rotation axis, at least one linear shaping element with a contour having at least partially an unrolled external contour of the rotationally symmetric structural component or a preform of the structural component is moved tangentially to the surface of the synchronously rotating blank, and the linear shaping element is at the same time pressed against the blank so that during the tangential movement the contour of the linear shaping element is formed at least partially into the blank. A (Continued)

kingpin or link pin of a connection link with a connection shaft and a link outer part is produced.

13 Claims, 4 Drawing Sheets

(51) Int. Cl.

| | | |
|---|---|---|
| *B21D 22/08* | (2006.01) | |
| *B21H 5/02* | (2006.01) | |
| *B21H 7/00* | (2006.01) | |
| *B21D 53/88* | (2006.01) | |
| *B21D 22/16* | (2006.01) | |
| *F16D 3/223* | (2011.01) | |

(52) U.S. Cl.
CPC .............. *B21D 53/88* (2013.01); *B21H 5/027* (2013.01); *B21H 7/00* (2013.01); *F16D 3/223* (2013.01); *F16D 2250/0023* (2013.01)

(56) References Cited

U.S. PATENT DOCUMENTS

| | | | |
|---|---|---|---|
| 4,829,800 A | 5/1989 | Killop | |
| 4,918,961 A * | 4/1990 | Hill | B21D 53/28 72/88 |
| 2004/0007034 A1 | 1/2004 | Kreissig | |

FOREIGN PATENT DOCUMENTS

| | | |
|---|---|---|
| DE | 100 28 165 A1 | 12/2001 |
| DE | 10 2005 022 801 A1 | 11/2006 |
| EP | 0 127 997 B1 | 12/1984 |
| EP | 0 421 143 A2 | 4/1991 |
| GB | 2 114 482 A | 8/1983 |
| JP | 58-199633 A | 11/1983 |
| JP | 60-166136 A | 8/1985 |
| JP | 10-230337 A | 9/1998 |
| JP | 2000-18234 A | 1/2000 |
| JP | 2004-074163 A | 3/2004 |

\* cited by examiner

METHOD AND DEVICE FOR PRODUCING ROTATIONALLY SYMMETRICAL METAL COMPONENTS

CROSS REFERENCE TO RELATED PATENT APPLICATIONS

This patent application is a continuation of PCT/EP2014/062685, filed Jun. 17, 2014, which claims priority to German Application No. 10 2013 106 268.7, filed Jun. 17, 2013, the entire teachings and disclosure of which are incorporated herein by reference thereto.

FIELD OF THE INVENTION

The invention relates to a method for producing rotationally symmetric structural components of metal, in particular steel, in which a blank is arranged in a torsion-proof manner on a first receptacle, the receptacle is rotated about a rotation axis so that the blank is caused to rotate about this rotation axis. In addition the subject matter relates to a device for producing a rotationally symmetric structural component of a metal, in particular steel from a blank, with a receptacle rotatable about a rotation axis for a blank of metal, in particular steel and forming means with which a contour can be formed into the blank.

BACKGROUND OF THE INVENTION

Rotationally symmetric structural components of metal, in particular kingpins or link pins of a connection link, are used for example to transmit rotational movements, so as to connect to one another by positive engagement rotation axes that are not running in parallel. Preferably the link pins are produced from metal, in particular steel. A link pin or a kingpin normally has a connection shaft and a bell-shaped link outer part that has an inner contour to accommodate positive engagement means. In the production of the kingpins or link pins an outer counter must therefore be formed, for example in the region of the connection shaft, and an inner contour must be formed, for example in the region of the link outer part. Kingpins and link pins but also other rotationally symmetric structural components must have a particularly high degree of precision in their shape in order to perform satisfactory functions. For example, in the case of link outer parts, undercuts are often provided in order to fix a ball cage in the inner contour. At the same time, however, ball tracks must also be provided, in which the balls are moveably arranged and despite force transfer allow various angles in the transfer of the rotational movement. In addition it is known to produce rotationally symmetric structural components of steel using a pressure roller method, in which a metal blank is arranged on a rotatable receptacle, is caused to rotate, and is pressure rolled via driven or freely rotating rolls. However, it has been found that, especially with complex shape forming processes, the use of pressure rolls does not provide an optimal solution as regards accuracy and process time.

Starting from this background the object of the present invention is to provide a method and a device for producing rotationally symmetric structural components with which rotationally symmetric structural components of metal, in particular steel, and also of complex geometry, can be produced with sufficient accuracy and shorter process times.

BRIEF SUMMARY OF THE INVENTION

According to a first teaching of the present invention the aforementioned object is achieved with a method in that at least one linear shaping element with a contour having at least partially an unrolled external contour of the rotationally symmetric structural component or a preform of the structural component is moved tangentially to the surface of the synchronously rotating blank, wherein the linear shaping element is at the same time pressed against the blank so that during the tangential movement the contour of the shaping element is formed at least partially into the blank.

It has been found that by using a linear shaping element that has a shaping contour that corresponds to the unrolled flat contour of the structural component to be produced or a preform of the structural component to be produced, the forming and shaping of the rotationally symmetric structural component or preform of the structural component is achieved with a shorter process time and greater accuracy. Owing to the synchronous movement of the blank and linear shaping element the contour of the shaping element is transferred to the blank and a rotationally symmetric structural component is produced. With this, the forming procedure of the contour resembles pressure rolling and thus ensures a particularly high accuracy. Owing to the fact that the contour of the structural component to be produced or a preform of the structural component can be incorporated very precisely into the linear shaping element, a very accurate transfer of this unrolled contour onto the rotating blank is also possible, whereby also very complicated geometries can be transferred to the rotating blank. Linear shaping elements that have the unrolled contour of the rotationally symmetric structural component or a preform thereof can in addition be produced more simply than for example by pressure rolling with corresponding contours.

According to a first arrangement of the method the blank is transformed by a linear shaping element subdivided in the rotation axis direction into at least two segments, wherein the segments of the shaping element are associated with different axial sections of the blank and the contour of the relevant segment is formed into the respective axial sections. In this way different contours can be incorporated in parallel in various axial sections of the blank, for example in sections with different diameters of the blank. In addition, owing to the segmented division of the shaping element a change in shape of an axial section of the rotationally symmetric structural component, for example with a product replacement, can easily be taken into account simply by replacing the segment.

According to a further arrangement differently structured contours can be formed in the respective axial sections of the blank by ensuring that during the shaping of the contour of the shaping element the tangential velocities of the individual segments of the shaping element are different. Due to this measure it is possible to take account of the different path velocity of the blank with various diameters of axial sections of the blank during the forming of the contour.

If according to a further arrangement two linear shaping elements in engagement with the blank on opposite sides of the blank are used to form the contour in the blank, the mechanical loading of the rotatable receptacle can be minimised since the oppositely arranged shaping elements exert forces on the blank that as a result mutually compensate one another. In this way the loading of the bearing of the rotatable receptacle is reduced. At the same time, owing to the double use of shaping elements an increase in the operating speed during the transformation is achieved.

Preferably an internal contour can furthermore be produced in the blank, in that by means of at least one shaping element a contour of the receptacle of the blank is formed as an internal contour in the blank to be formed. For example, the receptacle of the blank can have the internal contour of a link outer part of a link pin, which can be formed in a simple manner in the blank by the linear shaping elements.

According to a further arrangement of the method a rotationally symmetric preformed blank is formed, so that additional forming steps can be avoided.

Preferably a kingpin or a link pin of a connection link with a connection shaft and link outer part is produced. The advantage of the method according to the invention can be utilised particularly effectively in the production of kingpins or link pins, since a rotationally symmetric internal contour has to be produced in the link outer part of the kingpin or link pin and also a rotationally symmetric positive engagement means of the connection shaft have to be produced with a high degree of precision. Owing to the use of the linear shaping elements, which are preferably subdivided into various segments, in addition a parallel shaping of the different axial sections of the kingpin or link pin is possible.

The process times in the production of the rotationally symmetric structural components can be reduced still further, in that according to one arrangement the rotationally symmetric blank is preformed on a second rotatable receptacle by pressure rolling using at least one roll. Owing to the preforming step, which can be carried out preferably in parallel with the further transformation of the preformed blank using the linear shaping elements, the degree of transformation to be introduced via the linear shaping elements can be reduced overall. The roll can in this case be freely rotating or driven.

A further improvement of the capacity in the production of rotationally symmetric structural components of metal, in particular steel, is achieved in that, according to a further arrangement, the internal and external contour of the finished structural component can be at least partially finally formed in a preformed structural component on a further rotatable receptacle by using at least one further linear shaping element moving tangentially to the rotation axis of the blank. Due to this measure the production process of the structural components is subdivided into an optional preforming of the blank by pressure rolling, production of a preformed structural component having the external contour and optionally the internal contour, and final forming of the structural component using the preformed structural component. If all three operating steps, preforming of the blank, preforming of the structural component and final forming of the structural component, are carried out in parallel, for example on a total of three rotatable receptacles, the production capacity of the method can be significantly increased.

In addition the method can be improved when using higher strength materials, in that these are hot formed or the pressure rolling takes places at hot forming temperatures. For this purpose the blank is heated, preferably inductively, to a temperature of 400° C. to 1100° C., preferably to a temperature above the $AC_1$ or above the $AC_3$ temperature of the material, and is formed at the desired temperature. The hot forming at the corresponding temperatures can for example however also be employed only for partial regions of the link part, for example the hub or bell, or for forming the cage, ball or roller tracks. The forming can be followed by a hardening, which can also extend over only partial regions or can include the whole structural component. With hot forming the danger of crack formations in higher strength materials can be reduced.

According to a further teaching of the present invention the aforementioned object is also achieved by a device for producing a rotationally symmetric structural component of a metal, in particular steel in that at least one linear shaping element is provided, which has as contour at least partially the unrolled external contour of the rotationally symmetric structural component or a preform of the structural component, means are provided for moving the at least one shaping element tangentially and synchronously to the rotating blank, wherein in addition means are present for exerting a force from the at least one linear shaping element onto the rotating blank, so that the contour of the at least one linear shaping element is at least partially formed into the blank.

As already mentioned, it has been found that by using linear shaping elements by means of a movement tangential to the rotation of the blank and which is synchronised with the rotation of the blank, a simple shaping possibility exists for introducing complicated geometries into a blank rotating on a rotation axis.

If as means for moving the at least one linear shaping element there is provided at least one receptacle moveable at least tangentially and synchronically with the rotating blank for the at least one linear shaping element, then by simply exchanging the linear shaping elements the device can be converted to provide other geometries of the rotationally symmetric structural component.

If the receptacle of the blank has a contour that in the at least partial forming of the contour of the shaping element into the blank is shaped at least partially as internal contour of the structural component, a kingpin or link pin for example can be produced in a simple manner. The internal contour, for example of the link outer part of the kingpin or link pin, is formed by the shaping of the contour of the linear shaping element in conjunction with the contour of the receptacle of the blank. The forming process is particularly precise and accordingly also leads to particularly precise internal contours and/or external contours of the structural component.

In order to take account of different path velocities of the rotating blank on account of different radii, it is possible to subdivide the at least one linear shaping element in the rotation axis direction into at least two segments that are associated with different axial sections of the blank. The different axial sections of the blank can for example have different radii, so that the different segments of the at least one shaping element can have different, unrolled contours. In this way the flexibility for shaping is further increased and at the same time a modular construction of the at least one linear shaping element is achieved.

If means are provided for varying the tangential movement velocities of the individual segments of the at least one shaping element or of the respective shaping elements, it is possible to take into account the different path velocities of the blank surface and incorporate these in the blank of the preformed structural component. For example, this may be necessary if an axial section of the structural component has a particularly small diameter, so that the path velocity when the blank rotates is relatively small. The segment of the at least one shaping element associated with this axial section can then for the purposes of a better shaping have for example a different tangential velocity than the segment that is provided for an axial section for example with a large diameter with a high path velocity. In particular, due to the means for varying the tangential movement velocity of the segments it can be ensured that with a contour in the segment various contours can be generated in the structural component.

If several shaping elements are used for the shape forming, then due to the varying of the tangential movement velocity of the respective shaping element a different contour can be formed in a simple way in the blank with the respective shaping element.

Particularly preferably at least one segment of at least one shaping element comprises means for moving the segment relative to the receptacle of the shaping element, so that independently of the velocity of the at least one further segment of the linear shaping element the velocity of the other segment can be varied and thereby a specific contour of the structural component can be introduced in an axial section of the structural component. As means for the movement relative to the linear shaping element there may for example be provided guide rails for forced guidance, as well as linearly driven movement means.

According to a further arrangement of the device two linear shaping elements are provided, which are in engagement with the blank or with the preformed structural component on opposite sides of the rotating blank. The loading of the rotatable receptacle on account of the forming forces that are applied via the linear shaping elements can largely be compensated by this embodiment. In addition, owing to the use of two shaping elements an increase in the production rate can be achieved, as already mentioned, since each individual linear shaping element only has to achieve a reduced degree of transformation of the blank or of the preformed structural component.

According to a further arrangement of the device a preforming device is provided, which comprises a further rotatable receptacle for a blank of metal, in particular steel, and includes pressure rolling means with which the blank arranged on the further rotatable receptacle can be rotationally symmetrically preformed using the pressure roller means. By means of this preforming process blanks can be preformed to approximately the final contour, so that they can then receive by means of linear shaping elements the contour of a preformed structural component or of a finally formed structural component. Owing to the preforming device the capacity of the device according to the present invention can moreover be raised, since the preforming steps can take place in parallel to the transformation of the preformed blank for example in the structural component.

A further increase of the capacity of the device is achieved in that a final forming device is provided, which comprises at least one linear shaping element that has at least partially the unrolled external contour of the rotationally symmetric structural component, means are provided for moving the at least one linear shaping element tangentially and synchronously to the rotating preformed structural component, wherein additional means are present for exerting a force from the at least one linear shaping element onto the rotating preformed structural component, so that the preformed structural component can be finally formed. Owing to this device a further parallelisation and subdivision of the method into preforming of the blank, preforming of the structural component and final forming of the structural component can be achieved and in this way the individual transforming steps can be accomplished in parallel, so that the capacity is increased overall. Preferably the preforming device for the blank, the preforming device for the structural component and the final forming device for the structural component are equipped with a handling system so that the transportation of the blanks to be worked from the preforming device to the final forming device takes place automatically.

BRIEF DESCRIPTION OF THE DRAWINGS

The invention will now be illustrated in more detail with the aid of exemplary embodiments in conjunction with the drawings, in which.

DETAILED DESCRIPTION OF THE INVENTION

Figure 1:
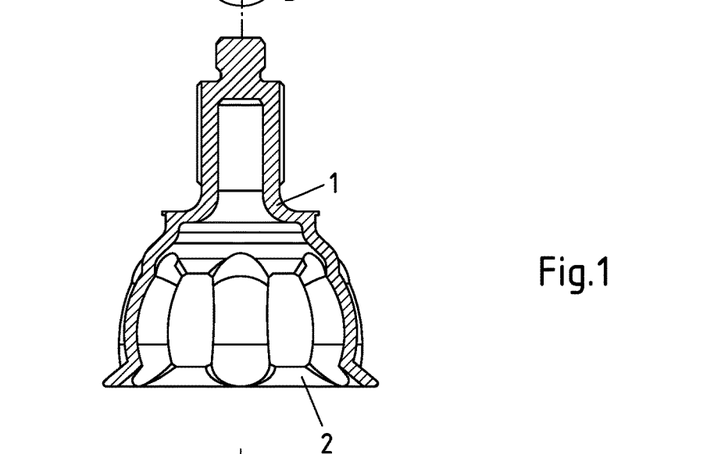
FIG. 1 is a sectional view of an exemplary embodiment of a rotationally symmetric structural component to be produced in the form of a link pin.

A typical, rotationally symmetric structural component 1 in the form of a kingpin and/or link pin, which usually is produced from a steel, is first of all illustrated in a sectional view in FIG. 1. Kingpins and/or link pins, like other rotationally symmetric structural components, often have to meet high accuracy requirements. These accuracy requirements have to be met in spite of a cost-effective and rational manufacturing process. In FIG. 1 the produced structural component 1 is shown still on the receptacle 2 used during the production by the method according to the invention, by means of which the internal contour of the structural component 1 is formed during the formation of the external contour.

Figure 2:
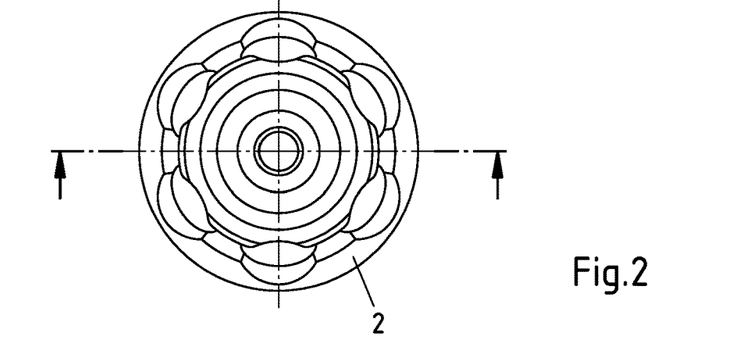
FIG. 2 is a plan view of a first exemplary embodiment of a rotatable receptacle for a blank.

FIG. 2 shows a plan view of the complex design of the receptacle 2, by means of which a rotationally symmetric internal contour, for example in a corresponding blank that is arranged thereon, can be introduced. The receptacle 2 rotates usually around the rotation axis provided in the centre.

Figure 3:
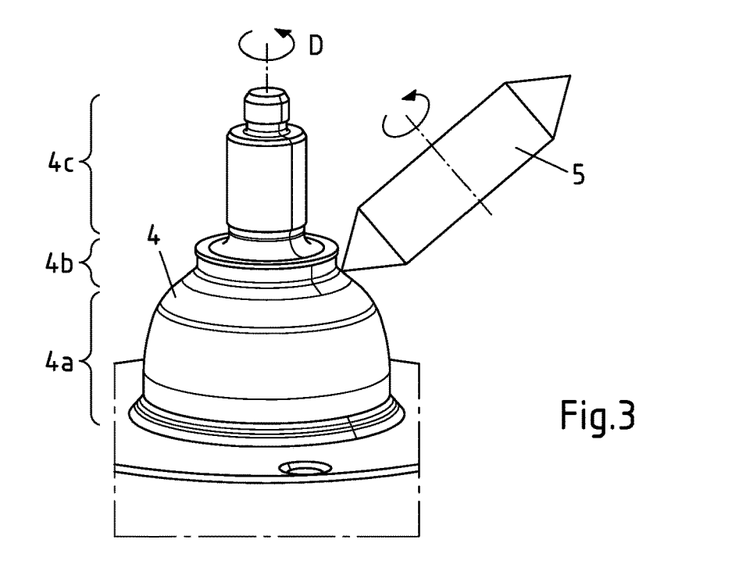
FIG. 3 is a perspective, schematic representation of an exemplary embodiment of a preforming device for the blank.

It serves in particular to accommodate a blank 4 illustrated in perspective and schematically in FIG. 3. Preferably the blank 4 is pre-formed by pressure rolling using at least one freely rotating or driven roll 5. Due to the optional preforming initial contours can for example be introduced into the blank, which subdivides this for example into the axial sections for 4a, 4b, 4c.

Figure 4:
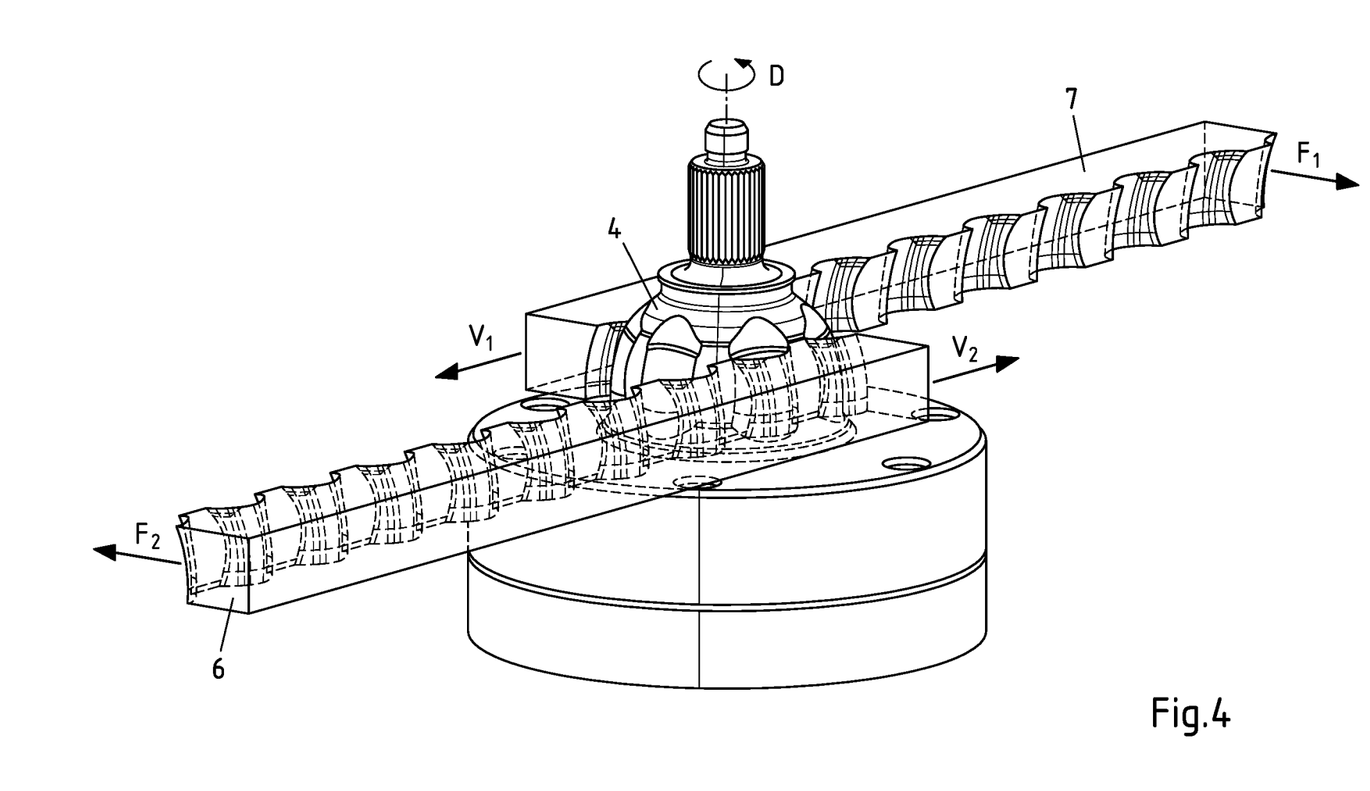
FIG. 4 is a perspective representation of a first exemplary embodiment for producing rotationally symmetric structural components.

FIG. 4 now shows a first exemplary embodiment of the method according to the invention, in which at least one shaping element, here two linear shaping elements 6, 7, are pressed against the rotating blank and are moved tangentially to the surface of the synchronously rotating blank, wherein the linear shaping elements 6, 7 are pressed against the blank in such a way that the unrolled contour of a rotationally symmetric structural component introduced in the linear shaping elements 6, 7 is introduced into the blank 4. The arrows $F_1$ and $F_2$ in FIG. 4 show the force directions with which the shaping elements 6, 7 act on the blank 4. In addition the arrows $V_1$ and $V_2$ also show the movement direction of the shaping elements. The blank 4 moves synchronously with the movements of the shaping elements 6, 7, so that these can introduce a rotationally symmetric contour into the blank. Due to the contour of the receptacle of the blank as illustrated in FIG. 1, an internal contour is also introduced at the same time into the blank body.

Figure 5:
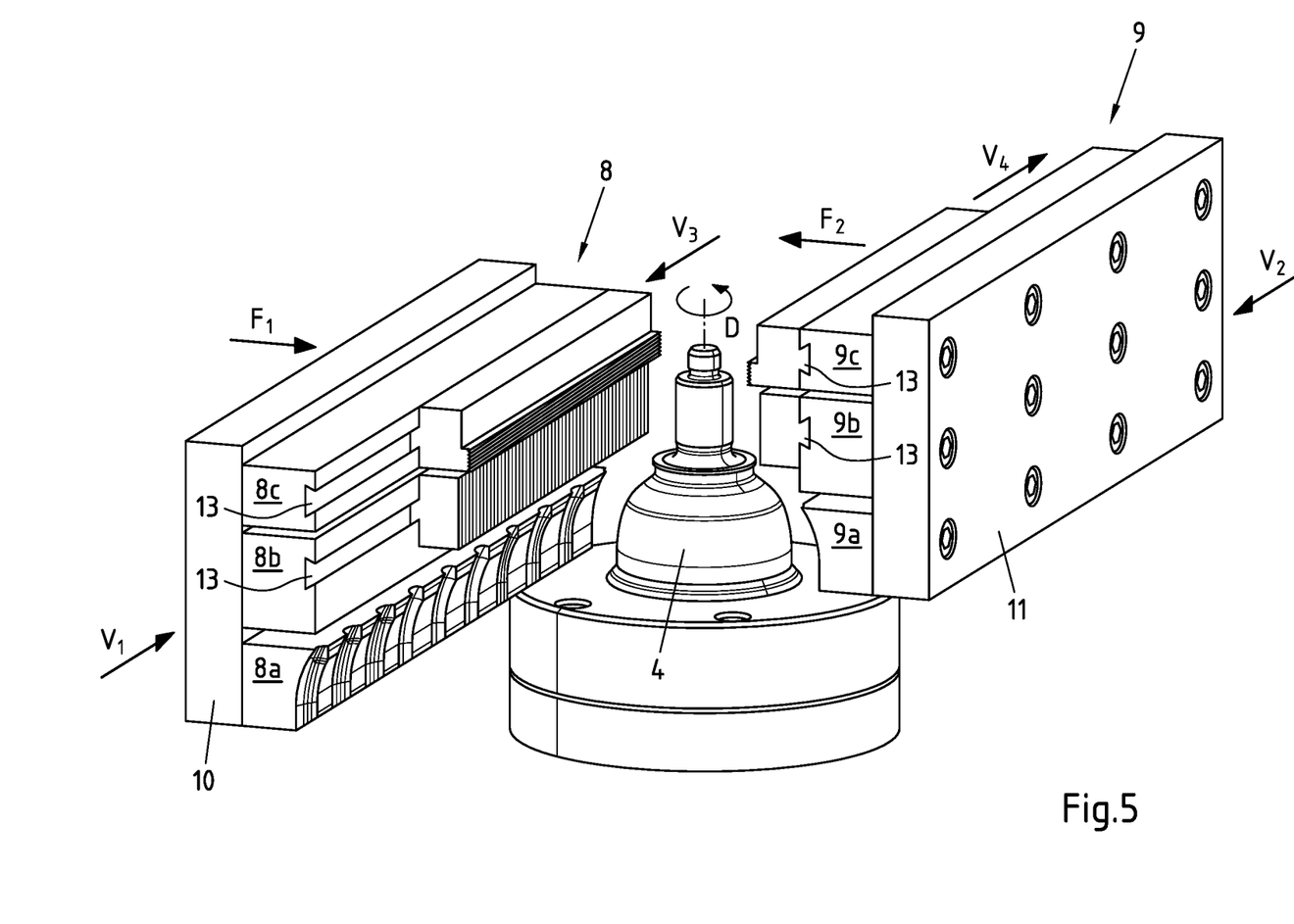
FIG. 5 is a schematic, perspective representation of a further exemplary embodiment of a device for producing rotational symmetric structural components before the shape forming step.
Figure 6:
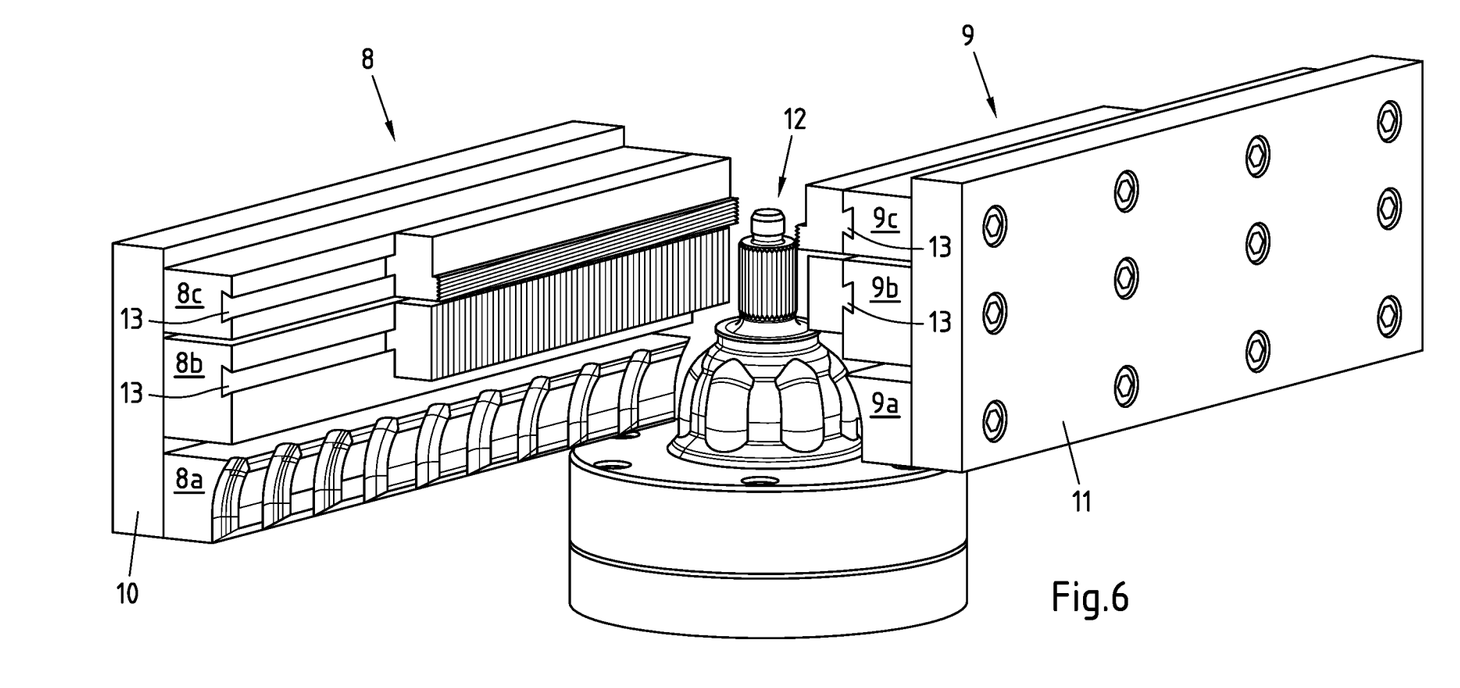
FIG. 6 is a schematic, perspective representation of the exemplary embodiment of FIG. 5 after the shape forming step.

FIGS. 5 and 6 show a further exemplary embodiment of the device and method. According to the exemplary embodiment in FIG. 5 a blank 4 is transformed, in which linear shaping elements 8, 9 are used that are subdivided in the rotation axis direction D into respectively three segments. The segments 8a, 8b, 8c, 9a, 9b, 9c are associated with the respective axial sections 4a, 4b, 4c of the blank and in each case have different contours corresponding to the axial sections of the structural component to be produced. In addition the segments 8c, 8b, 9c, 9b can be varied in their tangential movement velocity, since these are moveably arranged independently of the segment 8a, 9a. A guide rail allows via a tongue-and-groove connection 13 relative movements to be performed with respect to the receptacle 10, 11 of the segments 8a, 8b, 8c, 9a, 9b, 9c, which can take place for example via forced guidance means or also via drive means, not shown. In this way the velocity of the tangential movement of the segments of the shaping elements can be adapted in each case in accordance with the contours required in the individual axial sections of the finished structural component. As can also be recognised in FIG. 5, on the receptacle 10, 11 a segment of at least one shaping element can be exchanged in a simple manner in order for example to provide another contour in an axial section of the blank or structural component. In the exemplary embodiment of FIG. 5 the forces $F_1$ and $F_2$ with which the shaping elements, in particular the segments 8a, 8c, 8b, 9a, 9b, 9c of the shaping elements 8, 9 are pressed against the blank are also shown. In addition the velocity arrows $V_1$ and $V_2$ show the direction in which the receptacles 10 and 11 move relative to the rotating blank 4.

At the same time the possibility is provided of moving the segments 8c, 8b and also 9c, 9b with different velocities, for example $V_3$ and $V_4$ relative to the receptacles 10, 11, so that with pressing against the for example preformed blank 4 arranged on the rotatable receptacle, the different axial shape forming operations can be carried out. In particular the velocity of the segments 8b, 8c, 9b, 9c can be adapted to the contours envisaged in the respective axial sections.

FIG. 6 shows in a schematic, perspective representation the exemplary embodiment of FIG. 5 after the shape forming operation. It can clearly be seen on the produced link pin 12, that this has different contours in the different sections. The method step illustrated in FIGS. 5 and 6 can be used either as a final shaping method step or as a method step for the preparation of a preform, so that the degrees of transformation in the production of the rotationally symmetric structural components are subdivided into several steps up to the final shape. The arrows show the movement direction of the receptacle 10, 11 of the linear shaping elements 8, 9, so that the finished structural component 12 can be removed.

FIG. 7 shows once again in a greatly simplified manner an exemplary embodiment of the method in the form of a block diagram, in which a blank R is subjected to a first preforming step A by means of pressure rolling, the preformed blank is transformed in the process step B into a preformed structural component, and finally in the process step C is transformed into the final shape. In the process steps B and C in each case at least one linear shaping element is used to introduce the contours of the shaping elements into the synchronously rotating blank. The method steps A, B, C are preferably carried out in parallel on in each case separate rotatable receptacles, in order to increase the production capacity of the device and method. It is also conceivable, as illustrated by the broken arrow, for a preformed blank to execute only two method steps, namely method step B and then method step C. It is also conceivable that the blank undergoes only a method step C.

Figure 7:
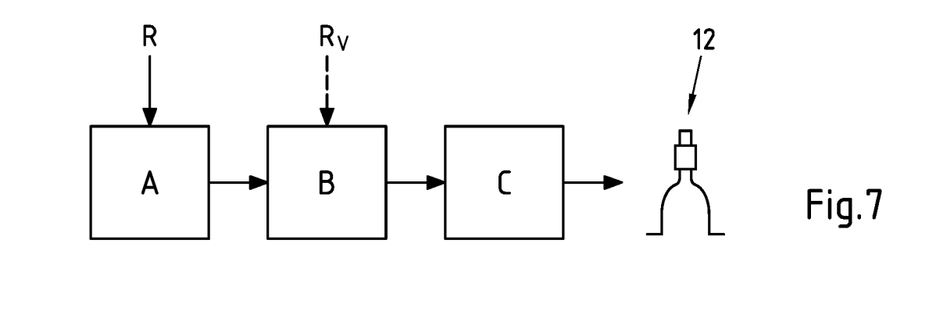
FIG. 7 is a block diagram of an exemplary embodiment of the method according to the invention.

At the end of the method step C a finished, rotationally symmetric structural component of a metal or steel is produced, which has a high degree of precision and can be produced simply and in a rational manner despite its complex geometry. This rotationally symmetric structural component can for example be a kingpin and/or link pin 12.

The invention claimed is:
1. A method comprising the steps of:
arranging a metal blank on a first receptacle such that the metal blank is rotationally fixed in relation to the first receptacle, the metal blank having an external contour having at least a first axial section and a second axial section,
rotating the first receptacle about a rotation axis so that the metal blank rotates with the first receptacle about the rotation axis,
moving at least one linear shaping element with a first contour and a second contour tangentially to the surface of the rotating metal blank, the first contour being different from the second contour,
pressing the at least one linear shaping element against the metal blank at the same time as moving the at least one linear shaping element so that the first contour of the linear shaping element is formed at least partially into the first axial section of the metal blank and so that the second contour of the linear shaping element is formed at least partially into the second axial section of the metal blank.

2. The method according to claim 1, wherein the at least one linear shaping element is subdivided in a direction of the rotation axis into a first segment and a second segment, wherein the first segment of the at least one linear shaping element includes the first contour and is associated with the first section of the blank and the second segment of the at least one linear shaping element includes the second contour and is associated with the second section of the blank.

3. The method according to claim 2, characterised in that the first and second segments of the at least one linear shaping element have different tangential movement velocities during the step of moving the at least one linear shaping element.

4. The method according to claim 1, characterised in that the at least one linear shaping element is two linear shaping elements in engagement with the metal blank on opposite sides of the metal blank, used to form the external contour into the metal blank.

5. The method according to claim 1, wherein the first receptacle comprises a third contour and wherein the method further comprises forming an internal contour corresponding to the third contour into the metal blank using the at least one linear shaping element.

6. The method according to claim 5, further comprising a step of finally forming the internal contour and the external contour of the metal blank on a further rotatable receptacle on a parallel processing line using at least one further linear shaping element moving tangentially to the rotation axis of the blank.

7. The method according to claim 1, characterised in that the metal blank is a rotationally symmetric preformed blank.

8. The method according to claim 1, wherein, prior to the step of arranging, the method further comprises preforming a rotationally symmetric blank on a second rotatable receptacle by pressure rolling using at least one roll and wherein the rotationally symmetric blank is the metal blank used in the arranging step.

9. An apparatus comprising:
a first receptacle for a blank of metal rotatable about a rotation axis; and
transforming means comprising:
at least one linear shaping element configured to at least partially form an external contour of a kingpin or a link pin into an exterior of the blank,
means for moving the at least one linear shaping element tangentially and synchronously to the blank, and
means for exerting a force from the at least one linear shaping element onto the blank, so that the external contour is at least partially formed into the blank,
wherein the first receptacle for the blank is configured to at least partially form an internal contour into an interior of the blank at the same time as the at least one linear shaping element at least partially forms the external contour into the exterior of the blank, wherein the at least one linear shaping element is subdivided in the rotation axis direction into at least two segments, which are associated with different axial sections of the blank.

10. The apparatus according to claim 9, characterised in that means are provided for varying the tangential movement velocities of each of the at least two segments of the at least one linear shaping element or of the respective linear shaping elements.

11. The apparatus according to claim 9, further comprising at least one linear shaping element receptacle and wherein the means for moving moves at least one segment of the at least one linear shaping element relative to the at least one linear shaping element receptacle.

12. The apparatus according to claim 9, wherein the at least one linear shaping elements comprises a first linear shaping element and a second linear shaping element, wherein the first linear shaping element and the second linear shaping element are in engagement with the blank on opposite sides of the blank.

13. An apparatus comprising:
a receptacle for a blank of metal rotatable about a rotation axis; and
transforming means comprising:
at least one linear shaping element configured to at least partially form an external contour into an exterior of the blank,
means for moving the at least one linear shaping element tangentially and synchronously to the blank, and
means for exerting a force from the at least one linear shaping element onto the blank, so that the external contour is at least partially formed into the blank,
wherein the receptacle for the blank is configured to at least partially form an internal contour into an interior of the blank at the same time as the at least one linear shaping element at least partially forms the internal contour into the exterior of the blank,
wherein the apparatus further comprises a final forming device comprising:
at least one further linear shaping element configured to form an external contour of a rotationally symmetric structural component, the rotationally symmetric structural component being formed from the blank,
a further receptacle for the rotationally symmetric structural component rotatable about a rotation axis,
means for moving the at least one further linear shaping element tangentially and synchronously to the rotationally symmetric structural component, and
means for exerting a force from the at least one further linear shaping element onto the rotationally symmetric structural component, so that the rotationally symmetric structural component can be finally formed.

* * * * *

UNITED STATES PATENT AND TRADEMARK OFFICE
CERTIFICATE OF CORRECTION

PATENT NO. : 10,953,449 B2  
APPLICATION NO. : 14/963320  
DATED : March 23, 2021  
INVENTOR(S) : Michael Gövert et al.

Page 1 of 1

It is certified that error appears in the above-identified patent and that said Letters Patent is hereby corrected as shown below:

On the Title Page

Item (73) Assignee: reads "ThyssenKrupp Steel Europe AG, Duisburg (DE)" and should read --ThyssenKrupp Steel Europe AG, Duisburg (DE); WF Maschinenbau und Blechformtechnik GmbH & Co. KG, Sendenhorst (DE)--

Signed and Sealed this  
Twenty-fifth Day of May, 2021

Drew Hirshfeld  
*Performing the Functions and Duties of the*  
*Under Secretary of Commerce for Intellectual Property and*  
*Director of the United States Patent and Trademark Office*